US005555921A

United States Patent [19]

Aigner

[11] Patent Number: 5,555,921

[45] Date of Patent: Sep. 17, 1996

[54] STOP STRIP FOR A PROTECTIVE HOOD ON WOOD SHAPING MACHINES

[76] Inventor: Georg Aigner, Thannenmais, Reisbach, Germany, 94419

[21] Appl. No.: 244,801

[22] PCT Filed: Oct. 25, 1993

[86] PCT No.: PCT/EP93/02943

§ 371 Date: Aug. 15, 1994

§ 102(e) Date: Aug. 15, 1994

[87] PCT Pub. No.: WO94/05738

PCT Pub. Date: Mar. 17, 1994

[30] Foreign Application Priority Data

Nov. 13, 1992 [DE] Germany .......................... 42 38 449.4

[51] Int. Cl.[6] ............................... B27C 5/04; F16B 2/04; B27G 21/00; B27B 31/00

[52] U.S. Cl. .................. 144/253.2; 403/374; 144/135.2; 144/251.2; 144/252.1; 144/253.1

[58] Field of Search .................................... 403/372, 373, 403/374, 55, 59; 144/134 R, 134 A, 252 R, 252 A, 251 R, 253 R, 253 J

[56] References Cited

U.S. PATENT DOCUMENTS

| | | | |
|---|---|---|---|
| 1,947,885 | 2/1934 | Tautz | 144/253 J |
| 2,104,158 | 1/1938 | Hedgpeth | 144/253 J |
| 5,117,880 | 6/1992 | Kapton et al. | 144/251 R |
| 5,381,842 | 1/1995 | Aigner | 144/252 R |
| 5,477,899 | 12/1995 | Schmitt | 144/252 R |

*Primary Examiner*—W. Donald Bray
*Attorney, Agent, or Firm*—Cohen, Pontani, Lieberman, Pavane

[57] ABSTRACT

A stop strip with a clamping member for fastening in a vertical groove of a protective hood for wood shaping machines. The clamping member is formed by a die which is connected with the stop strip and has a mushroom-shaped head which engages in a vertical groove having a C-shaped cross section. The head is formed by two head parts which are displaceable relative to one another and can be spread apart against the walls of the groove.

9 Claims, 5 Drawing Sheets

STOP STRIP FOR A PROTECTIVE HOOD ON WOOD SHAPING MACHINES

BACKGROUND OF THE INVENTION

The invention is directed to a stop strip with a clamping member for vertically adjustable fastening in a vertical groove with a C-shaped cross section in a protective hood for wood shaping machines. The clamping member has a die with a mushroom-shaped head and can be clamped in the vertical groove by an adjusting screw.

Protective hoods are known for covering a cutting tool of wood shaping machines which is fastened to a spindle. These protective hoods are formed by two side walls connected by a rear wall, a vertically adjustable front protective shield, and a cover in which is provided a connection opening for a suction device. Vertical slots which serve to receive a stop strip or the like in a vertically adjustable manner are incorporated in the front edges of the side walls.

A stop strip of the type outlined above is described and shown in DE-OS 39 31 141. In this stop strip, the clamping member is a clamping piece that is held at an angle piece by means of a screw. The shape of the clamping piece is not described. After loosening the screw, the height of the angle piece can be adjusted, for which purpose the clamping piece slides within the C-shaped slot. When the desired height is reached, the screw must be tightened. Since this screw is located on the inside area of the protective hood, it is relatively difficult to reach and can only be adjusted after removing a transparent protective shield. The stop strip is fastened to the horizontal leg of the angle piece by means of two additional screws and can be adjusted only in its longitudinal direction after loosening the two screws, which are also only accessible after removing the protective shield. In cutting tools with a large diameter, the adjustments described above can only be made after the tool has been removed because only then is there the necessary access to the inside screws. The stop strip must be unscrewed when working with a curve-cutting stop.

Notwithstanding the relatively complicated fastening of the stop strip by a total of three screws described above, this stop strip cannot be swiveled toward or away from the cutting tool to adapt to different tool diameters, nor can it be swiveled out of the work area should this be necessary.

SUMMARY OF THE INVENTION

The invention has the object of developing a stop strip with a clamping member in such a way that the stop strip can be adjusted in a simple, easily accessible manner and without the help of auxiliary tools and can, if desired, be brought into a rest position in which to stop strip remains connected with the protective hood.

In a stop strip of the generic type indicated above, this object is met by the present invention in that the head is formed by two head parts which are shaped like circular disks, are displaceable relative to one another by means of the adjusting screw, and can be spread apart against the walls of the groove.

This solution has the substantial advantage that at least two adjustments, namely a vertical adjustment of the stop strip and an upward swiveling of the stop strip, can be carried out after loosening only one operating element—the adjusting screw. The head parts shaped like circular disks allow the stop strip to be rotated out of its horizontal work position into a vertical rest position after loosening the adjusting screw and can be clamped again in this position without having to remove the protective hood. In order to ensure two defined positions of the strip, a square locking body which engages between the defining edges of the vertical groove in the positions in question is formed at the underside of the stationary head part facing the stop strip.

According to an advantageous further development of the invention, the die can be displaced in a recess of the stop strip and clamped therein by means of the adjusting screw which projects through an elongated hole of the stop strip. This has the advantage that an additional adjusting position, namely the optimal adjustment of the stop strip at a stop ring, can be set by means of the individual adjusting screw. That is, after loosening the adjusting screw, the stop strip can be displaced in the direction of the elongated hole as well as rotated around the axis of the adjusting screw.

Further features and advantages of the invention are contained in the patent claims. An embodiment example shown in the drawing is discussed in the following description.

DETAILED DESCRIPTION OF THE PREFERRED EMBODIMENTS

Figure 1:
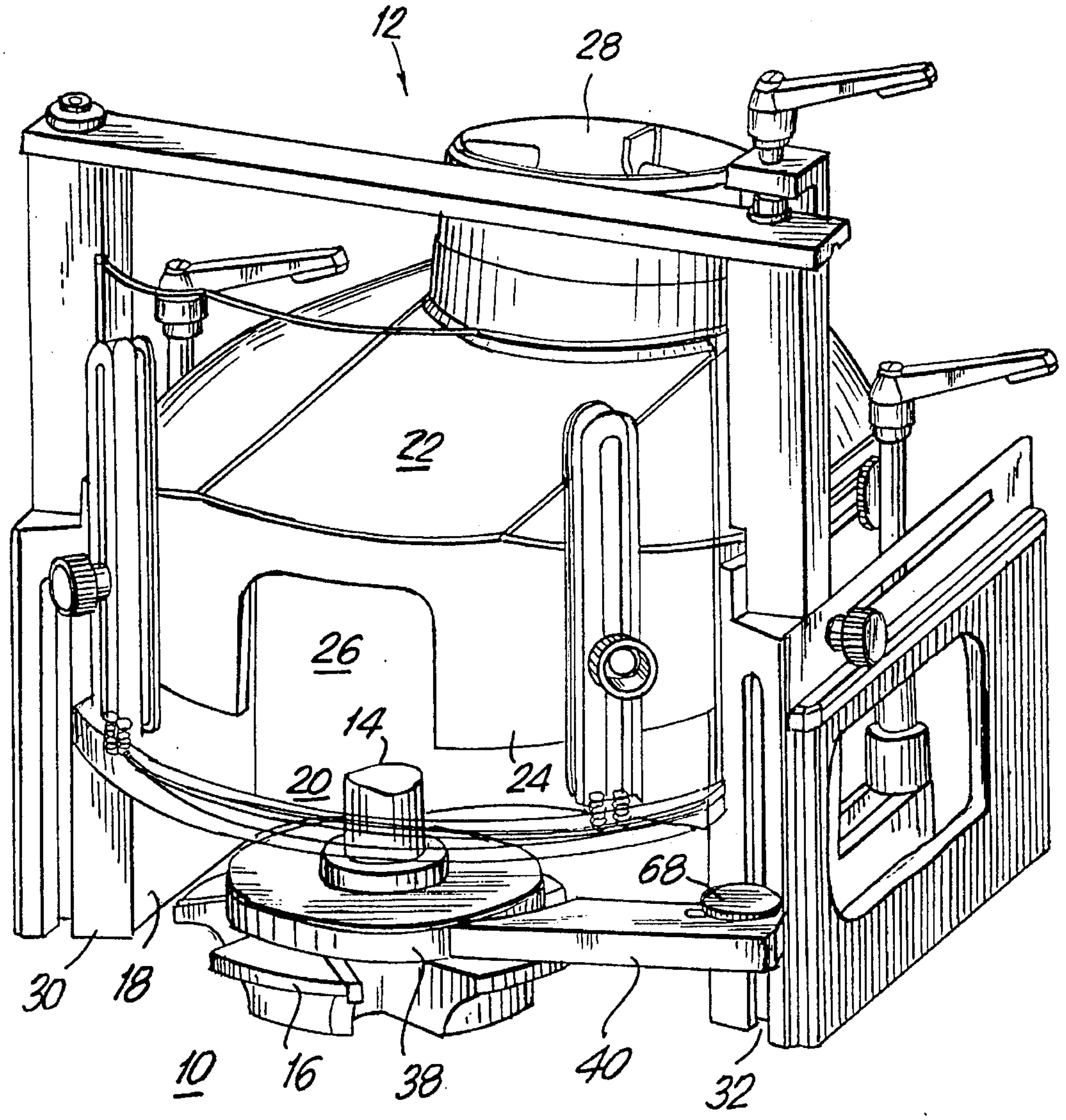
FIG. 1 shows a perspective view of a protective hood for wood shaping machines at which is arranged a stop strip constructed according to the invention.
Figure 2:
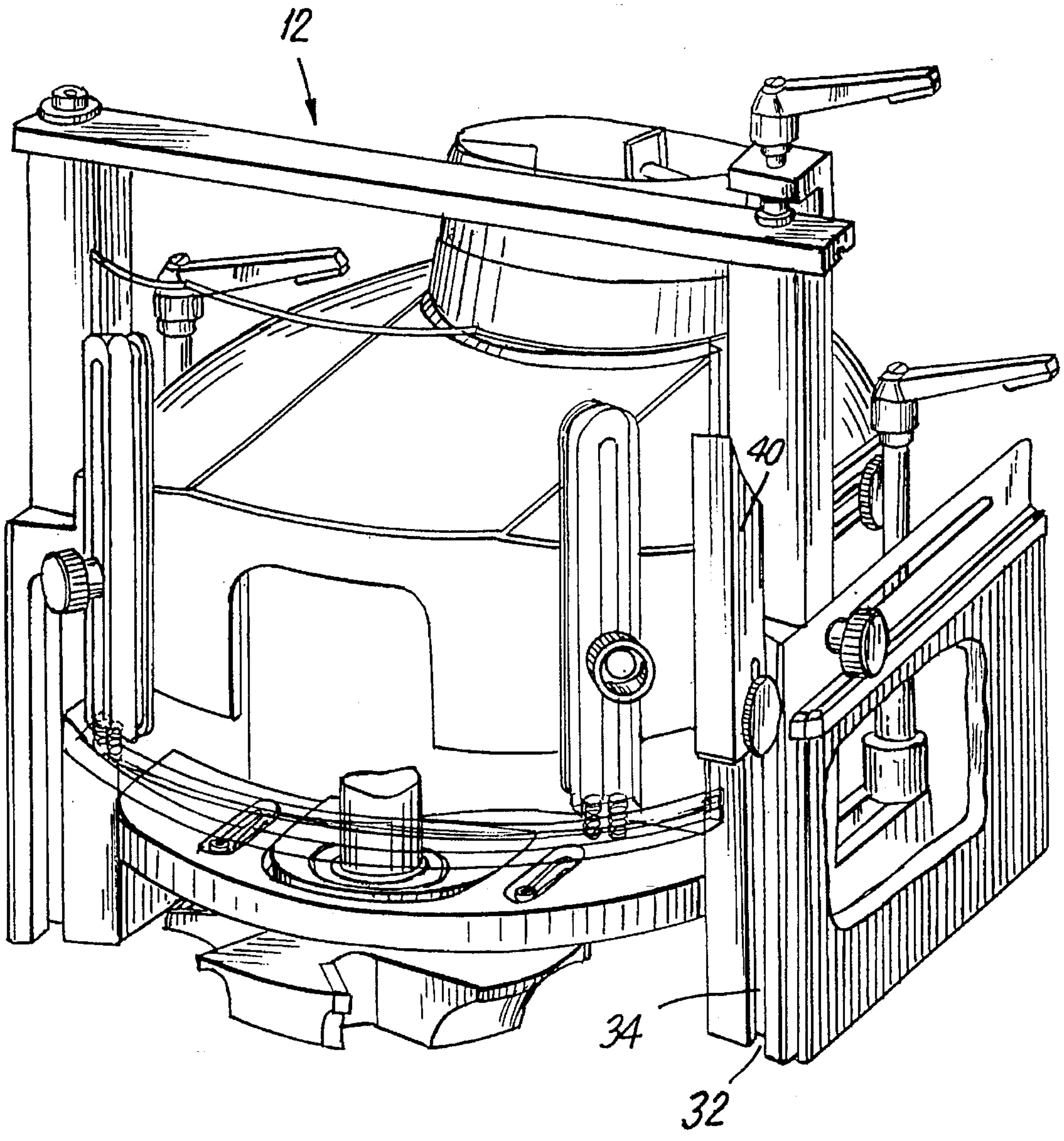
FIG. 2 shows a view corresponding to FIG. 1 in which the stop strip is swiveled up into its rest position.
Figure 3:
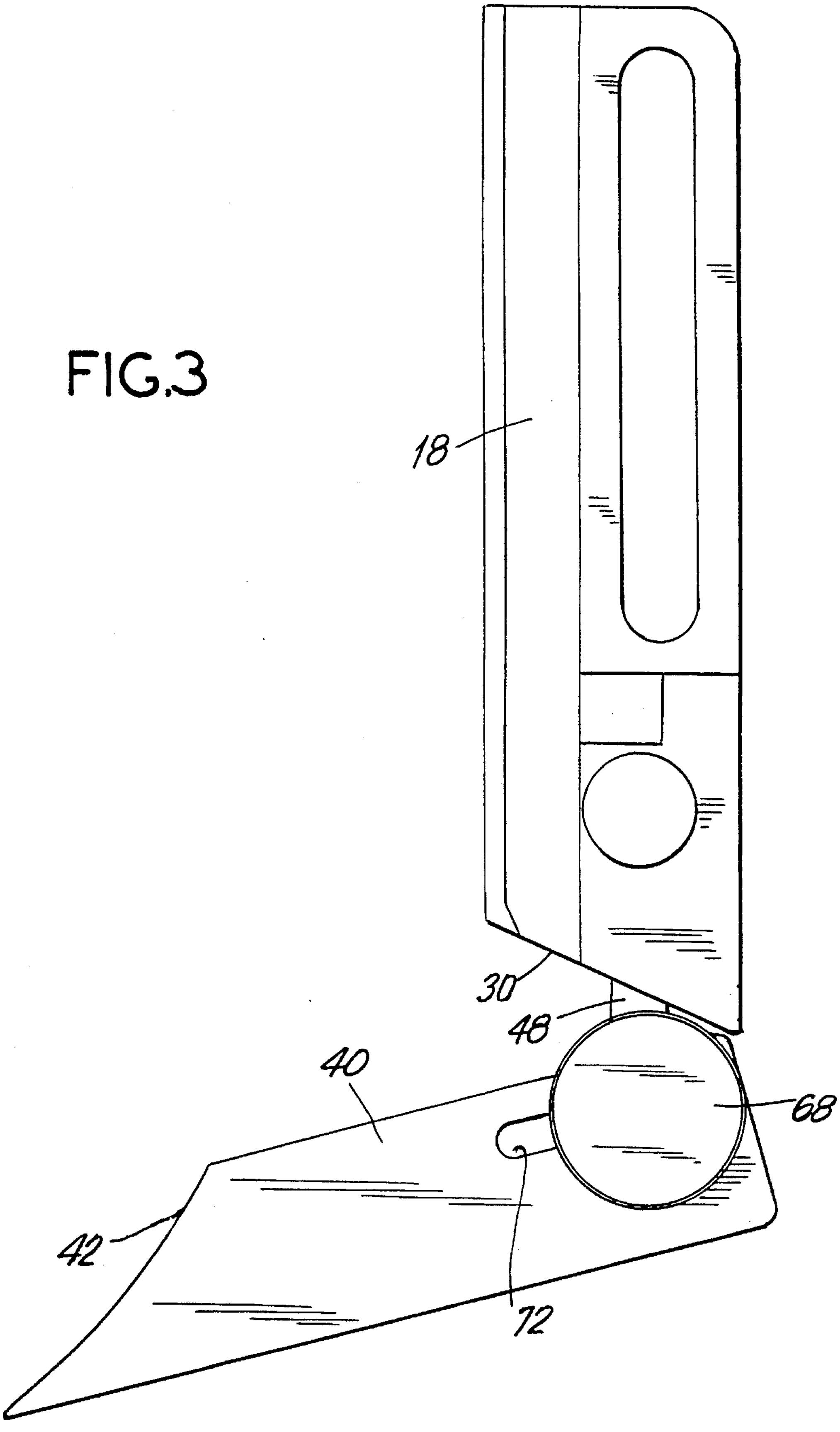
FIG. 3 shows a top view of the stop strip mounted at one of the two side walls of the protective hood.

A horizontal machine table 10 of a wood shaping machine is indicated in FIGS. 1 and 2. A protective hood 12 which covers the work area of a cutting tool 16 fastened to a spindle 14 is secured on the machine table 10. The protective hood 12 is formed by two side walls 18, a rear wall 20 connecting the latter, and a cover 22 which is rigidly connected with the rear wall 20. An edge 24 projects downward from the cover 22 at the front and sides and has in its front region a cut out portion 26 which opens downward and provides a more extensive view into the interior of the protective hood 12. The cover 22 has, in its rear area, a connection piece 28 for connecting a suction device.

Figure 4:
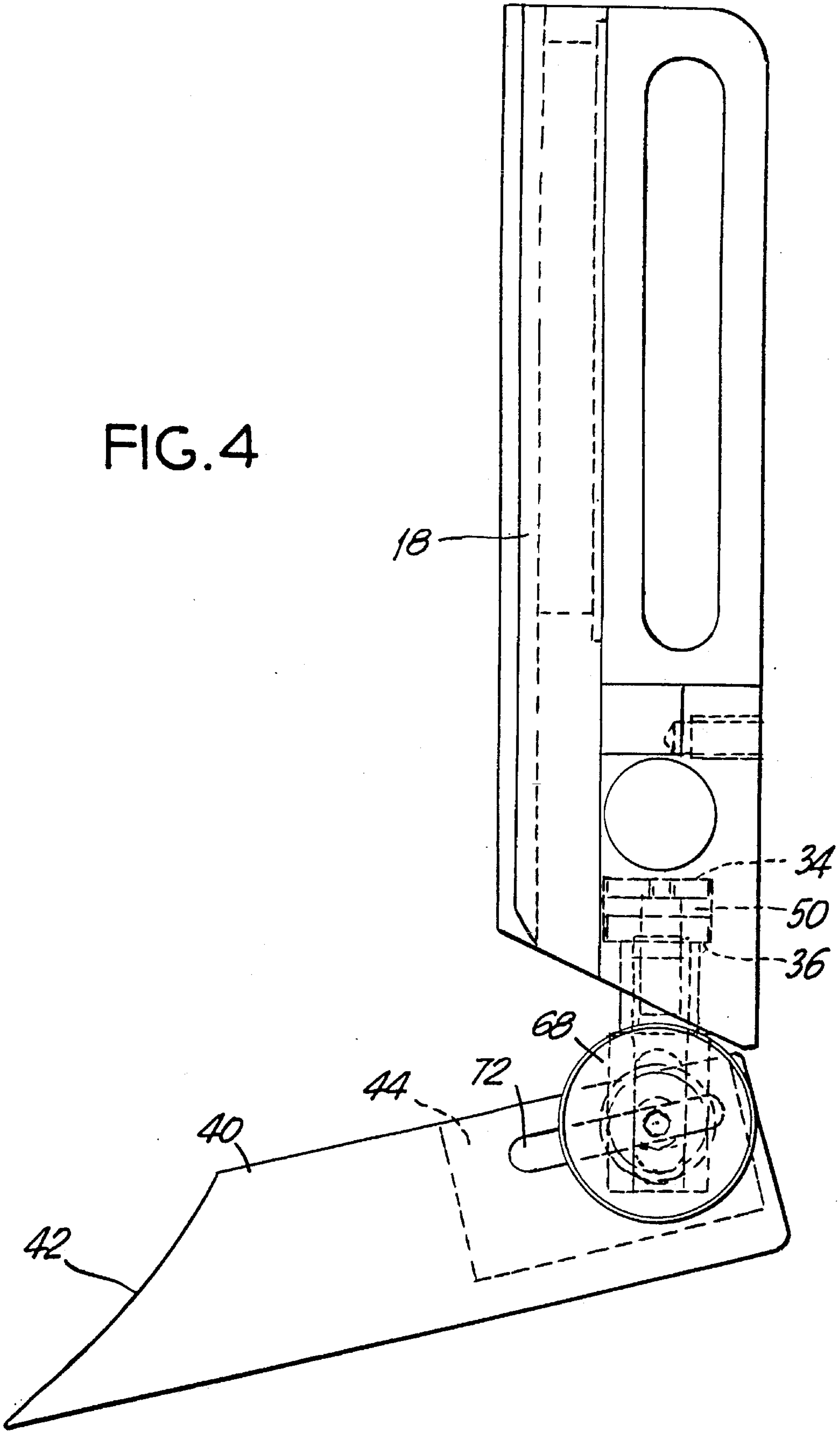
FIG. 4 shows a view corresponding to FIG. 3 in which the clamping member is shown in dashed lines.

Vertical grooves 32 having a roughly C-shaped cross section, shown in FIG. 4, are provided in the front edge areas 30 of each side wall 18. Accordingly, a rear defining surface 34 and two front clamping surfaces 36 are formed in the vertical groove 32. The lower end of each vertical groove 32 is open, but can be closed by a closing member, not shown.

A stop ring 38 which is supported on the spindle 14 by a ball beating serves to guide a curved workpiece to be shaped by the cutting tool 16. A stop strip 40 whose free, curved end 42 contacts the outer circumference of the stop ring 38 is provided to ensure safe feeding of the workpiece to the cutting tool 16 for shaping. The stop strip 40 which can be produced from plastic has a slot-shaped recess 44 at its end opposite the free end 42 and is fastened by means of a clamping member 46 in the vertical groove 32 on the right-hand side with reference to FIGS. 1 and 2.

Figure 5:
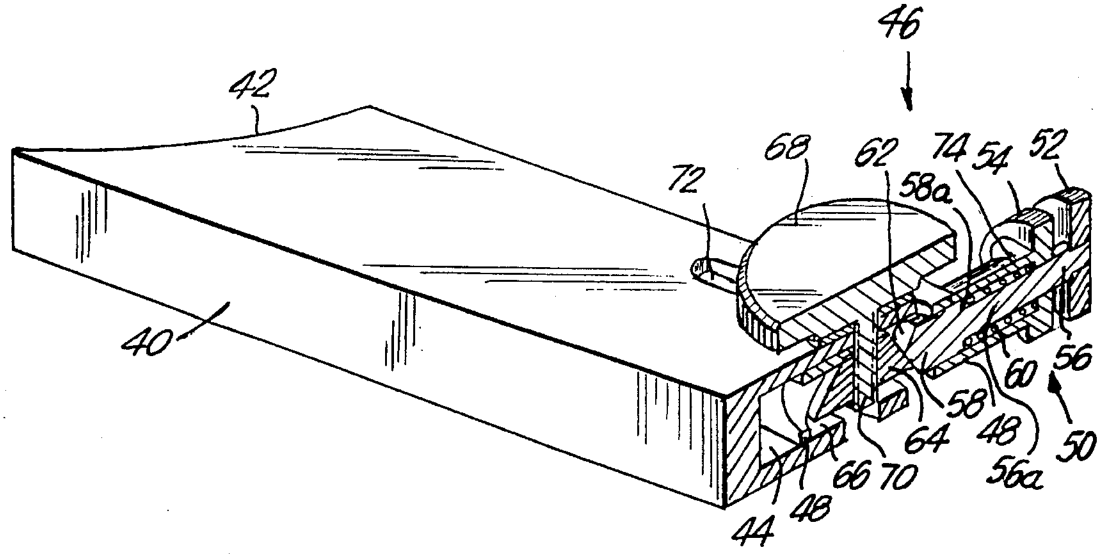
FIG. 5 shows a partially cut-away front oblique view of the stop strip showing the clamping member.

The clamping member 46 is formed by a die 48 with a head 50 with a mushroom-shaped widening. The head 50 itself is formed by two mutually displaceable head parts 52 and 54, both of which are constructed as circular disks. The head part 52 situated at the free end of the head is securely screwed to the free end of a rod 56 which is supported inside the die 48 so as to be displaceable in the longitudinal direction. As shown in FIG. 5, the diameter of the free end 58 of the rod 56 corresponds to the bore hole diameter of the die 48 and accordingly forms a collar 58*a* at a portion of the rod 56*a* with a reduced diameter against which a pressure spring 60 is supported. This pressure spring 60 surrounds the reduced diameter portion 56*a* of the rod and constantly endeavors to draw the rod 56 and, along with it, the head part 52 into the disengaged position.

The free end 58 of the rod 56 forms a conical tip 62 which is pressed by the pressure spring 60 against a wedge 64 which is supported in an elongated cut out portion 66 of the die 48 so as to be adjustable radially thereto. The diagonal surface of the wedge 64 opposite the tip 62 contacts a corresponding diagonal surface of the cut out portion 66.

The wedge 64 can move in the vertical direction, with reference to FIG. 5, by means of an adjusting screw 68. When moved upward, the wedge 64 displaces the rod 56 against the force of the pressure spring 60 so that head part 52 is moved away from the head part 54. The two head parts 52 and 54 are accordingly spread apart against the defining surface 34 and clamping surface 36, respectively, inside the vertical groove 32 so that the clamping member 46 and accordingly the stop strip 40 are finally secured. In this clamped position, the die 48 is also clamped inside the recess 44. Since the threaded shaft 70 of the adjusting screw 68 projects through an elongated hole 72 incorporated in the stop strip 40, the stop strip 40 can be adjusted in its longitudinal direction.

In order to swivel the stop strip 40 up out of its work position, shown in FIG. 1, into the rest position shown in FIG. 2, the adjusting screw 68 need only be loosened slightly so that the pressure spring 60 can pull back the rod 56 and, along with it, the head part 52 until a square locking body 74 formed at the underside of the head part 54 disengages from the defining edges of the vertical groove 32. The stop strip 40 and, along with it, the clamping member 46 is then swiveled up by 90°, whereupon the adjusting screw 68 is tightened again until the two head parts 52 and 54 regain their spread out position. In this position, the locking body 74 again engages between the defining edges of the vertical groove 32 so that the stop strip 40 is secured in its rest position, e.g. when work is performed without the stop ring 38. The locking body 74 accordingly guarantees at least two defined positions of the stop strip 40.

I claim:

1. A vertically adjustable stop strip fastenable in a vertical groove in a protective hood for a wood shaping machine, the stop strip comprising: a strip member; a clamping member connected to the strip member and having a die with a mushroom-shaped head; and adjusting screw means for clamping the clamping member in the vertical groove, the head of the die being formed by two head parts shaped as circular disks, the disks being displaceable relative to one another by the adjusting screw means so that the disks can be spread apart against the walls of the groove.

2. A stop strip according to claim 1, wherein one of the head parts is stationary and faces the strip member, and further comprising a square locking body formed at an underside of the stationary head part facing the strip member so as to engage between defining edges of the vertical groove.

3. A stop strip according to claim 1, wherein the strip member has a recess and an elongated hole, the die being displaceable and clampable in the recess of the strip member by the adjusting screw means which projects through the elongated hole of the strip member.

4. A stop strip according to claim 1, wherein one of the head parts is situated at a free end of the head, and further comprising a rod having one end fastened to the one head part and being supported inside the die so as to be longitudinally displaceable.

5. A stop strip according to claim 4, and further comprising a wedge arranged within the die so as to be radially adjustable, the rod having a second end remote of the one head part, the second end having a diagonal face situated so as to contact the wedge.

6. A stop strip according to claim 4, and further comprising spring means for drawing the rod toward a disengaging position.

7. A stop strip according to claim 5, wherein the wedge has a threaded bore hole, the adjusting screw means including a screw that is screwed into the threaded bore hole of the wedge.

8. A stop strip according to claim 5, and further comprising spring means for drawing the rod toward a disengaging position.

9. A stop strip according to claim 6, wherein the wedge has a threaded bore hole, the adjusting screw means including a screw that is screwed into the threaded bore hole of the wedge.

* * * * *